United States Patent [19]

Bartel et al.

[11] 4,444,489

[45] Apr. 24, 1984

[54] APPARATUS FOR INFLUENCING THE COLOR OF COPYING LIGHT IN PHOTOGRAPHIC COPYING MACHINES OR THE LIKE

[75] Inventors: Siegfried Bartel, Gauting; Ernst Biedermann, Taufkirchen; Wolfgang Ermer, Hirten; Erich Nagel, Anzing, all of Fed. Rep. of Germany

[73] Assignee: Agfa-Gevaert Aktiengellschaft, Leverkusen, Fed. Rep. of Germany

[21] Appl. No.: 417,636

[22] Filed: Sep. 13, 1982

[30] Foreign Application Priority Data

Sep. 17, 1981 [DE] Fed. Rep. of Germany ....... 3136901

[51] Int. Cl.³ .................... G03B 27/72; G03B 27/76
[52] U.S. Cl. ...................................... 355/35; 355/71; 355/88
[58] Field of Search ...................... 355/32, 35, 36, 71, 355/88, 37, 38

[56] References Cited

U.S. PATENT DOCUMENTS

| | | | |
|---|---|---|---|
| 3,901,592 | 8/1975 | Nepper | 355/35 |
| 3,923,393 | 12/1975 | Inoue et al. | 355/35 |
| 4,018,527 | 4/1977 | Bartel et al. | 355/35 |

*Primary Examiner*—L. T. Hix
*Assistant Examiner*—Brian W. Brown

*Attorney, Agent, or Firm*—Peter K. Kontler

[57] ABSTRACT

A photographic copying machine wherein each of the three color filters comprises several triangular sectors which are pivotable about parallel axes into and from the path of copying light between first positions outside of the path, second positions of full overlap with the path and a finite or infinite number of intermediate positions. The pulleys for the sectors of each filter are rotatable by a discrete endless cord or cable which is further trained over a wheel receiving torque from a crank drive designed to move the sectors into the path of the light beam through progressively greater angles during movement from the second toward the first positions and through progressively smaller angles during movement from the first to the second positions under the action of a reversible stepping motor so that the crank drive can compensate for the lack of linearity between the filtering action of the sectors and the extent to which they project into the path of copying light. A device is provided to limit the extent of movement of sectors from the first toward the second positions so as to ensure that the movement of the sectors is terminated when the respective filter extends across a selected portion of the path for the light beam. A step-down gearing is interposed between the stepping motor and the crank drive.

15 Claims, 3 Drawing Figures

APPARATUS FOR INFLUENCING THE COLOR OF COPYING LIGHT IN PHOTOGRAPHIC COPYING MACHINES OR THE LIKE

BACKGROUND OF THE INVENTION

The present invention relates to an apparatus for influencing a light beam with one or more color filters, and more particularly to improvements in apparatus for preferably infinitely varying the positions of the constituents of one or more composite filters with reference to a beam of copying light in a photographic copying machine or the like.

It is already known to influence the beam of copying light in a photographic copier by one, two or more filters each of which is assembled of several portions or sectors movable relative to each other as well as relative to the beam of light in order to exert a more or less pronounced influence upon the beam of light which is about to reach the original. As a rule, each composite filter is assembled of at least three sectors and the various filters are disposed one behind the other, as considered in the direction of propagation of copying light. The filter sectors have edge faces which extend substantially radially from the center of the opening for the passage of copying light toward the original. As a rule, the sectors of a composite filter are movable to, or close to, the positions of exact registry so that they form a composite filter which can intercept all or nearly all of the light in a particular color. Reference may be had to German Pat. No. 24 11 301 which discloses an apparatus of the above outlined character wherein the sectors of three filters are pivotable about axes extending in parallelism with the direction of propagation of copying light. All sectors of a composite filter are pivotable or turnable by a common driving unit including pulleys, which are secured to the pivots for the sectors, and a cable or cord which is trained over the pulleys. The or cable cord is an endless flexible element which is further trained over a driver pulley serving to change the angular position of each pulleyd to the same extent in response to rotation of the driver pulley about its own axis. In other words, the extent of penetration of individual sectors forming a composite filter into or from the path of copying light is always the same. The driver pulley is rotated by hand; this is a time-consuming operation so that the patented apparatus is evidently not suited for use in modern and relatively complex copying machines which are designed to turn out large numbers of copies per unit of time. As a matter of fact, the patented apparatus can be used only and alone in very simple copying machines wherein the output is of secondary importance or of no importance at all. Attempts to rotate the driver pulley by a motor have met with failure because the rate at which the filters can influence the color of copying light does not vary linealy with the rate at which the filter sectors extend into the path of copying light. Due to its remanent light transmissivity, a filter sector which intercepts 10% of copying light does not ensure a 10% coloration of the light beam. On the other hand, the geometry of the filters is such that, shortly prior to at least substantially complete closing of a composite filter, its filtering action increases at a very rapid rate, i.e., a curve denoting the progress of light interception in a particular color is relatively flat during the initial stage or stages of introduction of filter sectors into the path of copying light, but the slope of such curve increases rapidly during the last stage or stages of movement of filter sectors to those end positions in which the respective composite filter intercepts all or nearly all of the light in particular color.
stages of movement of filter sectors to those end positions in which the respective composite filter intercepts all or nearly all of the light in a particular color.

OBJECTS AND SUMMARY OF THE INVENTION

An object of the invention is to provide a light filtering apparatus which is constructed and assembled in such a way that the sectors of one or more composite filters can be xoved by motor means without adversely influencing the quality and reproducibility of the light-intercepting action.

Another object of the invention is to provide an apparatus which is designed to take into account the non-linear relationship between the light-intercepting action of filter sectors and the extent to which the sectors extend into a beam of copying light or the like.

A further object of the invention is to provide the apparatus with novel and improved drive means for moving the sectors of one or more composite filters.

An additional object of the invention is to provide a copying machine which embodies the above outlined apparatus.

Another object of the invention is to provide a light filtering apparatus which can be readily installed in many types of existing photographic or other copying machines as a superior substitute for heretofore known apparatus.

A further object of the invention is to provide the apparatus with novel and improved means for selecting the extent of penetration of filter sectors into the path of copying light.

Still another object of the invention is to provide an apparatus which is relatively simple and compact, which can be used with advantage in highly sophisticated or relatively simple copying machines, which renders it possible to achieve substantial savings in man-hours, especially in skilled labor, and which can be readily adjusted to conform its filtering action to the nature of an orrginal, to the nature of copying paper and/or to other variable parameters.

The invention is embodied in an apparatus for influencing the beam of copying light in a photographic or analogous copying machine. The apparatus comprises at least one composite filter including at least three discrete sectors movable into and from the path of the light beam between first positions at least substantially outside of such path, second positions in which the sectors extend at least substantially across the entire path, and a plurality (preferably an infinite number) of intermediate positions in each of which the sectors intercept a different percentage of light of a particular color. The apparatus further comprises means for moving the sections jointly between the first and second positions, and such moving means comprises stepping motor means and motion transmitting means interposed between the stepping motor means and the sectors. The motion transmitting means includes transmission means for varying the rate at which the sectors move into or from the path during different stages of movement of sectors between their first and second positions to thereby account for the absence of linearity between the extent of overlapping of the path by the sectors and the filtering action of the sectors. The sectors may resemble triangular filter components with edge faces which extend substantailly radially from the center of the path in the second positions of the sectors. Each sector is preferably pivotable between its first and second positions; for example, all of the sectors can pivot about axes which are parallel to one another and to the direction of propagation of the beam of copying light.

In accordance with a presently preferred embodiment of the invention, the transmission means comprises a crank drive having an output member (such as a link or a lever) which is movable at a relatively high velocity during movement of the sectors to or from their first positions (i.e., while the sectors are about to leave the path or about to enter the path) and at a relatively low velocity during movement of the sectors to or from their second positions (namely, when the sectors are about to reach or while the sectors are leaving the positions in which they overlie or extend across the entire path of the light beam). This can be achieved in a relatively simple and inexpensive manner by providing the crank drive with a crank arm which is rotatable about a fixed axis and is articuately connected with the aforementioned lever. The lever and the crank arm can make an angle of approximately or exactly 90° in the first positions of the sectors, and the lever and the crank arm are aligned with one another (i.e., the crank drive assumes a dead-center position) in the second positions of the sectors.

The moving means further comprises means for rotating the sectors about discrete axes and at speeds which are proportional to the velocity of the output member of the transmission means. A step-down gearing can be interposed between the stepping motor and the crank drive, and the rotating means can comprise a wheel or an analogous rotary element which is articulately connected with a first portion of the lever by a first pin or the like. A spaced-apart second portion of the lever is then connected with the crank arm by a second pin or the like. The crank arm is rotatable in clockwise and counterclockwise directions, and the apparatus can further comprise means for yieldably biasing the crank arm in one of these direction sin order to eliminate or reduce the play between the component parts of the step-down gearing.

The apparatus can further comprise means for limiting or selecting the number of revolutions of stepping motors means (such motor means can constitute or include a reversible electric motor) for the purpose of ensuring that the sectors of the filter penetrate into the light beam to a desired extent. The selecting means can comprise a microswitch or other suitable means for holding the stepping motor means against rotation in a direction to move the sectors from the second positions beyond the first positions, i.e., to arrest the sectors when they reach the first positions outside of the path for the light beam. The stepping motor means can comprise a shaft which is rotatable in clockwise and counterclockwise directions, and the selecting means can further comprise a series of successive neighboring cams (e.g., annular cams) rotatably mounted on the shaft and including a first cam and a last cam. The selecting means then further comprises a lobe provided on each of the cams and movable into engagement with the lobe of the neighboring cam in response to rotation with the shaft, and an additional lobe provided on the shaft and movable into engagement with the lobe of the first cam which then entrains the lobe of the second cam on rotation of the first cam with the shaft, and so forth. The microswitch or an analogous arresting means for the stepping motor means can be actuated by the lobe of the last cam.

The novel features which are considered as characteristics of the invention are set forth in particular the appended claims. The improved apparatus itself, however, both as to its construction and its mode of operation, together with additional features and advantages thereof, will be best understood upon perusal of the following detailed description of tertain specific embodiments with reference to the accompanying drawing.

DESCRIPTION OF THE PREFERRED EMBODIMENTS

Figure 1:
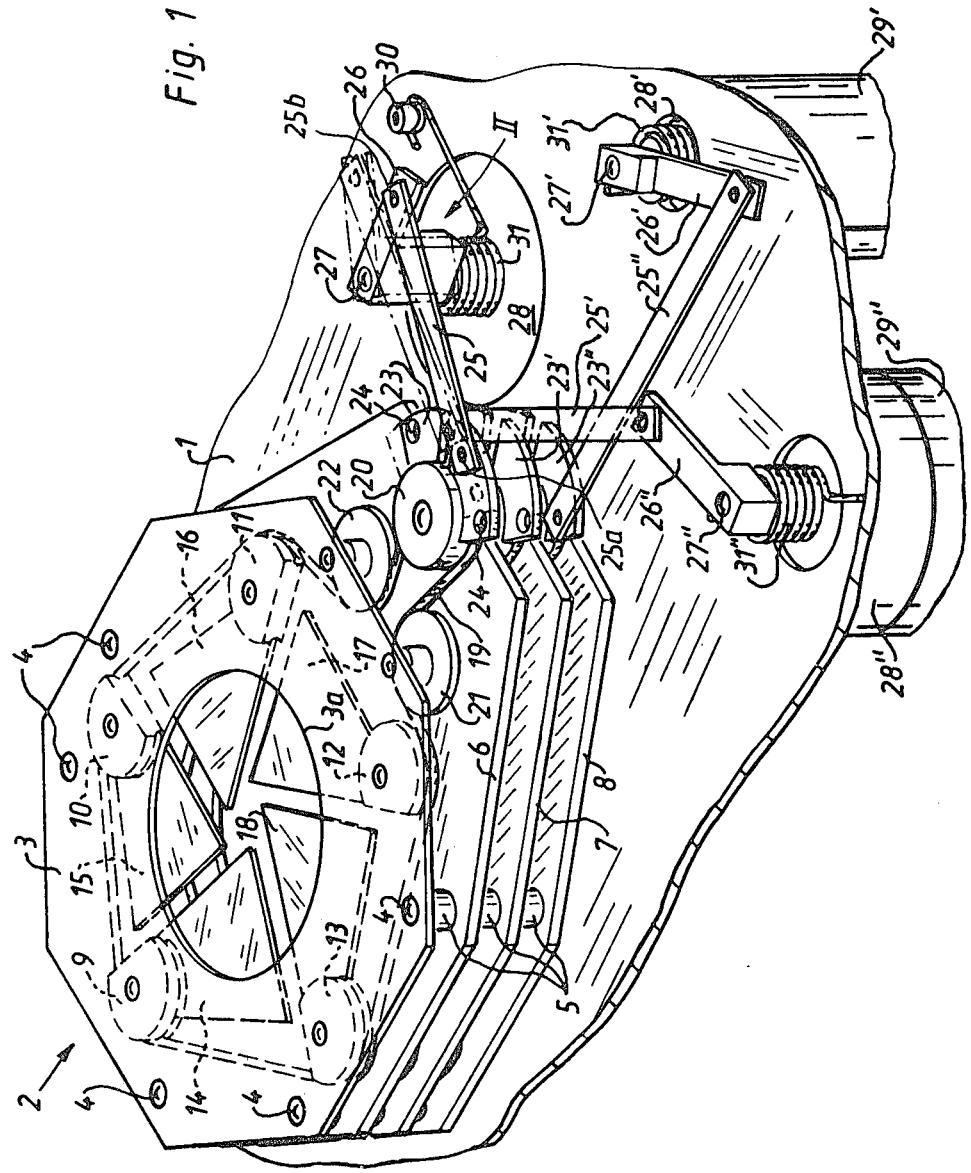
FIG. 1 is a fragmentary perspective view of an apparatus with three composite filters which embodies the present invention.

Referring first to FIG. 1, there is shown a plate-like support 1 which carries a filter assembly or unit 2. The latter comprises an octagonal plate-like holder 3 having a centrally located circular opening 3a whose center is located on the axis of a beam of copying light and which is in register with in opening (not shown) of the support 1. The holder 3 is connected with three carriers 6, 7 and 8 which are spaced apart from the holder 3 as well as from one another by distancing elements in the form of parallel bolts or studs 4 carrying distancing sleeves 5. The distancing means ensure that the carriers 6, 7 and 8 are disposed at predetermined distances from one another and from the holder 3. Each of the carriers 6, 7 and 8 carries a composite filter and certain components of the means for moving the constituents of the respective composite filters between their operative (second) and retracted (first) positions. The carrier 6 supports a composite filter for a first color, the carrier 7 supports a composite filter for a second color, and the carrier 8 supports a composite filter for a third color. The moving means comprises rotating means including five pulleys or sheaves 9, 10, 11, 12 and 13 which are rotatable about axes extending in parallelism with the axis of the beam of copying light, i.e., in parallelism with the line including the center of the opening 3a and the center of the opening in the support 1. Each of the sheaves 9 to 13 supports a discrete portion or sector of the respective composite filter. The composite filter which is supported by the carrier 6 includes five triangular filter sectors 14, 15, 16, 17 and 18 which are respectively supported and movable by the sheaves 9, 10, 11, 12 and 13 between first end positions in which such sectors are fully or nearly fully out of register with the opening 3a and second end positions in which the sectors 14 to 18 together constitute an at least substantially uninterrupted filter which overlies the entire opening 3a or, at the very least, the major part of such opening. In the second end positions of the sectors 14, 15, 16, 17 and 18, their apices preferably extend all the way to the line denoting the axis of the beam of copying light and including the center of the opening 3a.

FIG. 1 merely shows the sectors 14 to 18 of the composite filter which is supported by the carrier 6. The other two composite filters (not specifically shown) are preferably of identical design and are respectively supported by the carriers 7 and 8.

An endless flexible element 19 in the form of a cable or cord is trained over the sheaves 9 to 13 as well as over a rotary driving element or wheel 20 on the carrier 6. The wheel 20 is flanked by two closely adjacent guide rolls 21 and 22 for the flexible element 19, and at least one of such guide rolls can constitute a means for maintaining the flexible element 19 under requisite tension which ensures that rotation of the wheel 20 will result in predictable and reproducible angular movement of the pulleys 9 to 13. Each of the carriers 7 and 8 also supports five sheaves, a rotary driving element and two guide rolls for a second endless flexible element which can effect predictable angular displacements of sectors forming part of the respective composite filters. The color filters are normally interference filters each of which can intercept or block a certain region of the spectrum as completely as possible without influencing the light in the other regions of the spectrum. As a rule, the three composite filters are subtractive color filters including a yellow filter, a cyan filter and a magenta filter.

The wheel 20 carries an arcuate motion receiving member 23 formed with a series of bores or holes 24 which can be disposed at the same distance from the axis of the wheel 20. One of the holes 24 receives a first pin 25a at one end of a lever 25 the other end of which is articulately connected with the outer end portion of a crank arm 26 ty a second pin 25b. The inner end portion of the crank arm 26 is affixed to the shaft 27 of a step-down gearing 28. The lever 25 constitutes the output member of a transmission here shown as a crank drive receiving motion from a reversible stepping motor 29 (via gearing 28) and serving to drive the wheel 20 of the means for rotating the filter sectors 14 to 18. FIG. 1 further shows the arcuate motion receiving members 23′ and 23″ for the wheels (not shown) on the carriers 7 and 8. The member 23′ is articulately connected with a lever 25′ which is driven by a crank arm 26′ mounted on the shaft 27′ of a second step-down gearing 28′. The member 23″ can be driven by a lever 25″ which is articulately connected with a crank arm 26″ on the shaft 27″ of a third step-down gearing 28″.

Figure 2:
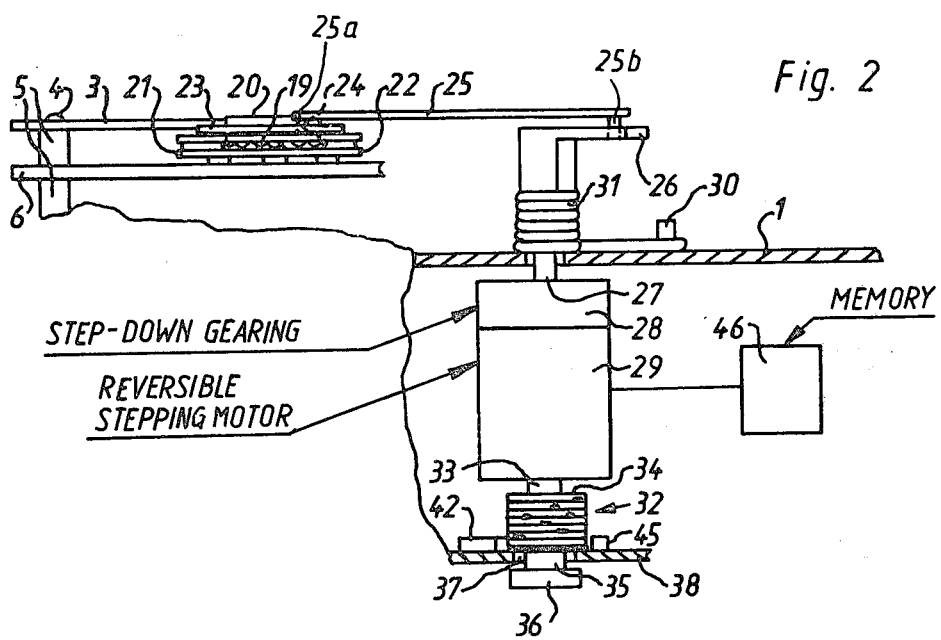
FIG. 2 is a fragmentary elevational view substantially as seen in the direction of arrow II in FIG. 1.

FIG. 2 shows the transmission for the wheel 20 which serves to rotate the pulleys or sheaves 9 to 13 on the carrier 6. The input element (not specifically shown) of the gearing 28 is connected with or constitutes the output member of the stepping motor 29. The crank arm 26 is permanently biased in one direction by a torsion spring 31 one end portion of which engages the crank arm 26 (or a part which rotates with the crank arm), the other end portion of which engages a fixed post 30 on the support 1, and the convolutions of which surround the shaft 27. The purpose of the sring 31 is to prevent any play or backlash between at least some gears of the gearing 28, for example, between the last two gears of such gearing.

Figure 3:
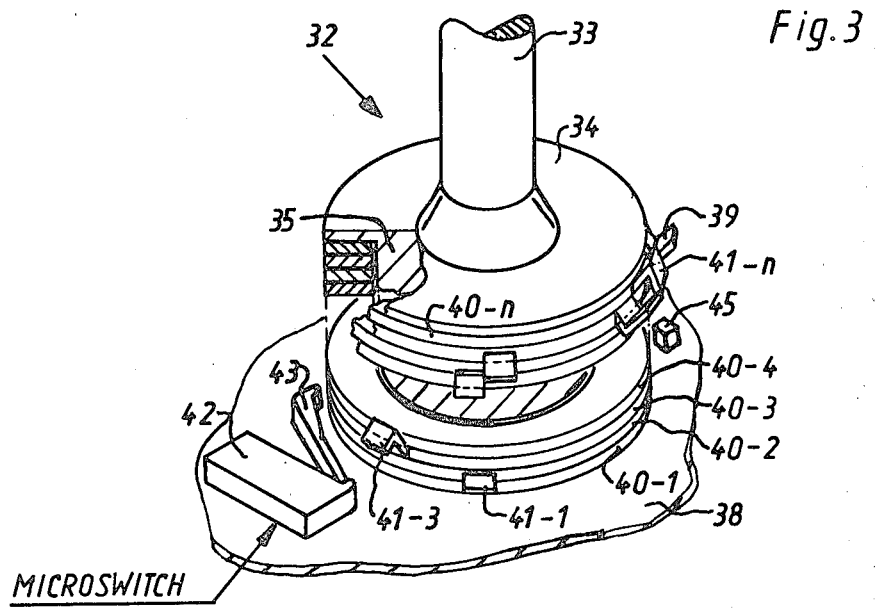
FIG. 3 is an enlarged perspective view of a portion of the structure which is shown in FIG. 2.

FIG. 2 further shows certain parts of a device 32 which serves to limit or select the number of revolutions of the stepping motor 29. This device is illustrated in greater detail in FIG. 3. As shown in FIG. 3, a shaft 33 which extends into the stepping motor 29 has a disc 34 with a substantially cylindrical extension or boss 35. The lower end portion of the extension 35, as viewed in FIG. 3, carries a small hand wheel 36. This extension passes with some clearance through an aperture 37 of a fixedly mounted platen 38, and the hand wheel 36 is disposed at the underside of the platen, i.e., at that side which faces away from the stepping motor 29. The extension 35 carries a series of neighboring concentric washer-like annular cams 40-1, 40-2, 40-3, 40-4—40-n. These cams are respectively provided with protuberances or lobes 41-1, 41-2, 41-3—41-n each of which extends beyond both major sides or surfaces, of the respective cam so that it can come into engagement with the lobes of the two neighboring cams. For example, the lobe 41-2 of the cam 40-2 can engage the lobe 41-1 of the came 40-1 as well as the lobe 41-3 of the cam 40-3.

The platen 38 further supports a microswitch 42 having a movable portion 43 which extends into the path of movement of the lobe 41-1 on the lowermost or last cam 40-1, namely, on that cam which is nearest to the platen 38. The latter also supports a stop 45 for the lobe 41-1. The arrangement is such that the lobe 41-1 engages the movable portion 43 of the switch 42 when it rotates in a clockwise direction, as viewed in FIG. 3, and that such lobe engages the stop 45 when in rotates in the counterclockwise direction. The lobe 41-1 and its came 40-1 come to a halt when the lobe 41-1 engages the stop 45 on the plates 38.

Each of the stepping motors 29′ and 29″ is also connected with means for limiting or selecting the number of its revolutions. Such means are identical with or analogous to the just described selecting or limiting means 32.

The mode of operation of the apparatus which is shown in FIGS. 1 to 3 is as follows;

When the wheel 20 is set in rotary motion, it drives the flexible element 19 which, in dependency on the direction of rotation of the wheel 20, moves the filter sectors 14 to 18 into or from the path of the copying light beam. If the diameters of the sheaves 9 to 13 and wheel 20 are identical, the sectors 14 to 18 complete angles of approximately 60° between their first and second end positions, i.e., positions fully outside of the opening 3a and positions of full or practically full register with such opening. The filter sectors 14 to 18 assume their first end positions (out of the beam of copying light) when the lever 25 and the associated crank arm 26 make an angle which equals or approximates 90°. These sectors assume their second end positions (in which they intercept all or nearly all of the light in the respective color) when the lever 25 and the crank arm 26 assume their dead-center positions, i.e., when their axes overlap and the axis of the shaft 27 is coplanar with and is located between the axes of the pins 25a and 25b. By appropriate selection of distances between the centers of the holes 24 and the axis of the driver wheel 20, as well as by appropriate selection of the effective length of the crank arm 26 (between the axis of the shaft 27 and the axis of the pin 25b), the designer of the apparatus can determine the relationship between the angular movement of the crank arm 26 and pivotal movements of filter sectors 14 to 18 between their first and second end positions.

In order to establish a desired starting or initial relationship between the rotary movements of the wheel 20 and the angular movements of the filter sections 14 to 18, the stepping motor 29 is caused to rotate in a clockwise direction, as viewed in FIG. 3, whereby the lobe 39 on the disc 34 engages and entrains the lobe 41-n on the uppermost or first annular cam 40-n. The lobe 41-n thereupon engages and entrains the lobe 41-n-1 of the second uppermost cam, and so forth, until the lobe 41-2 of the next-to-the-lowermost cam 40-2 ultimately engages and entrains the lobe 41-1 of the lowermost cam 40-1. The latter then rotates with the cams 40-2 to 40-n and with the disc 34, and its lobe 41-1 moves toward and engages the mobile portion 43 of the microswitch 42 which arrests the motor 29. In such position of the parts of the limiting or selecting means 32, the filter sectors 14 to 18 on the carrier 6 assume their first end positions, i.e., they are outside of the beam of copying light which passes through the opening 3a of the topmost carrier 3. The influencing of the light beam by the filter sectors can begin.

The control circuit of the stepping motor 29 is connected with the output of a memory 46 which stores the number of steps to be performed by the motor 29 (in a counterclockwise direction, as viewed in FIG. 3) for each degree of coloration of the beam of copying light. If the operation of the motor 29 is selected in such a way that each step involves an angular movement through 7½ degrees, and if the step-down ratio of the gearing 28 is 75:1, each revolution of the shaft 33 will involve an angular displacement of the filter sectors 14, 15, 16, 17 and 18 through angles of 6 minutes. In other words, if the angular displacement between the first and second end positions of the filter sectors 14 to 18 is 60°, such angular displacement necessitates approximately 600 steps of the stepping motor 29.

For example, if the results of preceding measurements or tests and/or the experience and expertise of the operators concerning the condition and quality of the original to be copied and/or the copying paper indicate that the degree of coloration in a particular color should equal or approximate 20%, the memory 46 is set (either by hand or automatically) to cause the stepping motor 29 to perform a certain number of steps, namely, to cause the shaft 33 to complete 120 steps in a counterclockwise direction, as viewed in FIG. 3. This causes the lobe 39 of the disc 34 to move away from one side of the lobe 41-n so that the disc 34 completes one revolution relative to the cam 40-n until the lobe 39 engages the other side of the lobe 41-n, and the cam 40-n then begins to rotate with the disc 34. The lobe 41-n-1 on the cam 40-n-1 begins to rotate the cam 40-n-2 after the cam 40-n-1 completes one full revolution with the disc 34, and so forth. If the extension 35 carries a total of twelve cams (40-1 to 40-n), the shaft 33 (which is connected with the disc 34) can make a total of thirteen revolutions (minus the combined width of the lobes 39 and 41-1 to 41-n, as considered in the circumferential direction of the disc 34) before the lobe 41-1 reaches the stop 45 which then prevents further counterclockwise rotation of the disc 34.

In accordance with the aforediscussed example, the motor 29 is brought to a halt by the memory 46 when the shaft 33 completes 120 steps which ensures adequate influencing of the beam of copying light by the filter for the respective color.

An important advantage of the improved apparatus is that the number of steps to be performed by the motors 29, 29' and 29" increases at least substantially linearly with the increasing percentage of coloration of the copying light beam in the respective color. It goes without saying that each of the motors 29' and 29" can be controlled in the same way (or in a similar way) as the above described mode of controlling the stepping motor 29.

Another important advantage of the improved apparatus is that it ensures a high resolution within the entire filtering range. Furthermore, by using stepping motors, one can ensure full reproducibility of concrete or stored information. The non-linear relationship between the extent to which the filter sectors cover or extend into the path of the beam of copying light and the coloring of the beam is compensated for, at least substantially, by the equally non-linear rate or nature of movement of the transmissions including the crank arms 26, 26' and 26" so that, on the whole, the influencing of the beam of copying light progresses at least substantially linearly with the steps of the motors 29, 29' and 29".

A copying machine which can employ the apparatus of the present invention is disclosed, for example, in commonly owned U.S. Pat. No. 4,274,732 granted June 23, 1981 to Siegfried Thurm et al.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for influencing the beam of copying light in a copying machine, comprising at least one composite filter including at least three discrete sectors movable into and from the path of the beam between first positions at least substantially outside of such path, second positions in which the sectors extend at least substantially across the entire path, and a plurality of intermediate positions; and means for moving said sectors jointly between said first and second positions, including stepping motor means and motion transmitting means interposed between said motor means and said sectors, said motion transmitting means including transmission means for varying the rate at which said sectors move into or from said path during different stages of movement of said sectors between said first and second positions.

2. The apparatus of claim 1, wherein said sectors have edge faces extending substantially radially from the center of said path in the second positions of said sectors.

3. The apparatus of claim 1, wherein said sectors are pivotable between said positions thereof.

4. The apparatus of claim 1, wherein said transmission means comprises a crank drive having an output member movable at a relatively high velocity during movement of said sectors to or from said first positions and at a relatively low velocity during movement of said sectors to or from said second positions.

5. The apparatus of claim 4, wherein said sectors are rotatable about discrete axes and said moving means further comprises means for rotating said sectors at speeds which are proportional to the velocity of said output member.

6. The apparatus of claim 5, further comprising a step-down gearing interposed between said motor means and said crank drive.

7. The apparatus of claim 5, wherein said rotating means comprises a rotary element and said crank drive further comprises a crank arm rotatable about a fixed axis, said output member comprising a lever having spaced-apart first and second portions and means for articulately connecting said first and second portions with said rotary element and said crank arm, respectively.

8. The apparatus of claim 7, wherein said crank arm is rotatable in clockwise and counterclockwise directions and further comprising means for yieldably biasing said crank arm in one of said directions.

9. The apparatus of claim 1, further comprising means for selecting the number of revolutions of said stepping motor means.

10. The apparatus of claim 9, wherein said selecting means includes means for holding said stepping motor means against rotation in a direction to move said sectors from said second positions beyond said first positions.

11. The apparatus of claim 9, wherein said stepping motor means includes a shaft rotatable in clockwise and counterclockwise directions and said selecting means further includes a series of successive neighboring cams rotatably mounted on said shaft and including a first and a last cam, a lobe provided on each of said cams and movable into engagement with the lobe of the neighboring cam in response to rotation with said shaft, and an additional lobe provided on said shaft and movable into engagement with the lobe of said first cam.

12. The apparatus of claim 11, wherein said cams are annuli surrounding said shaft.

13. The apparatus of claim 11, wherein said holding means comprises means for arresting said stepping motor means, said arresting means being actuatable by the lobe of said last cam.

14. The apparatus of claim 13, wherein said stepping motor means includes a reversible electric motor and said arresting means comprises switch means in circuit with said motor.

15. The apparatus of claim 1, wherein said transmission means includes a rotary crank arm and a lever articulately connected with said crank arm, said lever and said crank arm making an angle of approximately 90° in the first positions of said sectors and said lever and said crank arm being aligned with one another in the second positions of said sectors.

* * * * *